US008706663B2

(12) United States Patent
Nc et al.

(10) Patent No.: US 8,706,663 B2
(45) Date of Patent: Apr. 22, 2014

(54) DETECTION OF PEOPLE IN REAL WORLD VIDEOS AND IMAGES

(75) Inventors: Pramod Nc, Karnataka (IN); Gurumurthy Swaminathan, Karnataka (IN); Chaitanya Krishna Paturu, Andhra Pradesh (IN); Isaac Cohen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 682 days.

(21) Appl. No.: 12/697,830

(22) Filed: Feb. 1, 2010

(65) Prior Publication Data

US 2010/0195899 A1     Aug. 5, 2010

Related U.S. Application Data

(60) Provisional application No. 61/149,858, filed on Feb. 4, 2009.

(51) Int. Cl.
*G06K 9/00* (2006.01)
*G06F 17/30* (2006.01)

(52) U.S. Cl.
USPC .............................. 706/20; 382/103; 707/723

(58) Field of Classification Search
None
See application file for complete search history.

(56) References Cited

U.S. PATENT DOCUMENTS

2009/0097739 A1    4/2009  Rao et al.
2010/0315528 A1*  12/2010  Goh et al. ................. 348/222.1

OTHER PUBLICATIONS

Lee and Cohen, "A Model-Baed Approach for Estimating Human 3D Poses in Static Images", IEEE Transactions on Pattern Analysis and Machine Intelligence, vol. 28, No. 8, Jun. 2006, pp. 905-916.*
Seemann, Leibe, Mikolajczyk, Schiele, "An Evaluation of Local Shape-Based Features for Pedistiran Detection", Proceedings of the BMVC 2005, pp. 1-10.*
Zehnder, Koller-Meier and Van Gool, "A Hierarchical System for Recognition, Tracking and Pose Estimation", Machine Learning in Multimodal Interaction, Workshop 2004, from Lecture Notes in Computer Science 3361, Springer Verlag, 2005, pp. 329-340.*
Lee and Cohen, "A Model-Based Approach for Estimating Human 3D Poses in Static Images", IEEE Transactions on Pattern Analysis and Machine Intelligence, vol. 28, No. 8, Jun. 2006, pp. 905-916.*
Seemann, Leibe, Mikolajczyk, Schiele, "An Evaluation of Local Shape-Based Features for Pedestrian Detection", Proceedings of teh BMVC 2005, pp. 1-10.*

(Continued)

*Primary Examiner* — Kakali Chaki
*Assistant Examiner* — Walter Hanchak
(74) *Attorney, Agent, or Firm* — Husch Blackwell LLP

(57) ABSTRACT

Systems and methods for detecting people in video data streams or image data are provided. The method includes using a plurality of training images for learning spatial distributions associated with a plurality of body parts, detecting a plurality of detections of body parts in an input image, clustering the detections of body parts located within a predetermined distance from one another to create one effective detection for each cluster of detections, and determining a position of each person associated with each effective detection. The detections of body parts can be associated with respective previously learned spatial distributions.

18 Claims, 15 Drawing Sheets

(56) References Cited

OTHER PUBLICATIONS

Zehnder, Koller-Meier and Van Gool, "A Hierarchical System for Recognition, Tracking and Pose Estimation", Machine Learning in Mulitmodal Interaction, Workshop 2004, from Lecture Notes in Computer Science 3361, Springer-Verlag, 2005, pp. 329-340.*

Yan, Khan, Shah, "3D Model based Object Class Detecton in an Arbitrary View", IEEE 11th International Conference on Computer Vision 2007, Oct. 2007, pp. 1-6.*

Bdiri, Moutarde, and Steux, "Visual object categorization with new keypoint-based adaBoost features", IEEE, IEEE Symposium on Intelligent Vehicles (IV'2009), XiAn : China, 2009. pp. 1-6.*

Lowe, "Distinctive Image Features from Scale-Invariant Keypoints", Iternational Journal of Computer Vision, vol. 60(2), 2004, pp. 91-110.*

Liu and Yu, "Gradient Feature Selection for Online Boosting", Computer Vision, 2007. ICCV 2007. IEEE 11th International Conference on, Oct. 14-21, 2007, pp. 1-8.*

Wang, Al, Wu, Huang, "Real Time Facial Expression Recognition with Adaboost", Pattern Recognition, 2004. ICPR 2004. Proceedings of the 17th International Conference on (vol. 3 ), Aug. 23-26, 2004, pp. 926-929.*

Leibe, Leonardis, and Schiele, "Combined Object Categorization and Segmentation with an Implicit Shape Model", ECCV'04 Workshop on Statistical Learning in Computer Vision, Prague, May 2004, pp. 1-16.*

B. Leibe et al., Pedestrian Detection in Crowded Scenes, Proceedings of the 2005 IEEE Computer Society Conference Vision and Pattern Recognition (CVPR05).

B. Leibe et al., Combined Object Categorization and Segmentation With an Implicit Shape Model, ECCV'04 Workshop on Statistical Learning in Computer Vision, Prague, May 2004.

R. Fertus et al., Object Class Recognition by Unsupervised Scale-Invariant Learning, Proceedings of the 2003 IEEE Computer Society Conference on Computer Vision and Pattern Recognition (CVPR'03).

S. Agarwal et al., Learning a Sparse Representation for Object Detection, Proceedings of the Seventh European Conference on Computer Vision, 2002.

P. Viola et al., Roburst Real-Time Face Detection, International Journal of Computer Vision 57(2), 137-154, 2004.

C. Papageorgiou et al., Trainable Pedestrian Detection.

I. Ulusoy et al., Generative Versus Discriminative Methods for Object Recognition.

D.M. Gavrila, Pedestrian Detection from a Moving Vehicle, ECCV 2000, LNCS 1843, pp. 37-49, 2000.

N. Dalal et al., Histograms of Oriented Gradients for Human Detection, Proceedings of the 2005 IEEE Computer Society Conference on Computer Vision and Pattern Recognition (CVPR'05).

L. Havasi et al., Pedestrian Detection Using Derived Third-Order Symmetry of Legs, Computer Vision and Graphics, 733-739.

R. Lienhart et al., An Extended Set of Haar-like Features for Rapid Object Detection, IEEE ICIP 2002; 1-900-1-903.

B. Leibe et al., Interleaved Object Categorization and Segmentation, British Machine Vision Conference (BMVC'03), Norwich, UK, Sep. 2003.

B. Leibe et al., Scale-Invariant Object Categorization using a Scale-Adaptive Mean-Shift Search, DAGM'04 Pattern Recognition Symposium, Tubingen, Germany, Aug. 2004.

P. Viola et al., Detecting Pedestrians Using Patterns of Motion and Appearance, Proceedings of the Ninth IEEE International Conference on Computer Vision (ICCV'03).

B. Wu et al., Detection of Multiple, Partially Occluded Humans in a Single Image by Bayesian Combination of Edgelet Part Detectors, Proceedings of the Tenth IEEE International Conference on Computer Vision (ICCV'05).

D. Lowe, Distinctive Image Features from Scale-Invariant Keypoints, International Journal of Computer Vision 60(2), 91-110, 2004.

State Intellectual Property Office, P.R. China's Jan. 5, 2013 First Office Action.

Lee et al., A Model-Based Approach for Estimating Human 3D Poses in Static Images, IEEE Transactions on Pattern Analysis and Machine Intelligence, vol. 28, No. 6, Jun. 2006, pp. 6-17.

Seemann et al., An Evaluation of Local Shape-Based Features for Pedestrian Detection, Multimodal Interactive Systems, TU Darmstadt, Germany.

Zehnder et al., A Hierarchical System for Recognition, Tracking and Pose Estimation, S. Bengio and H. Bourlard (Eds.): MLMI 2004, LNCS 3361, pp. 329-340, 2005.

* cited by examiner

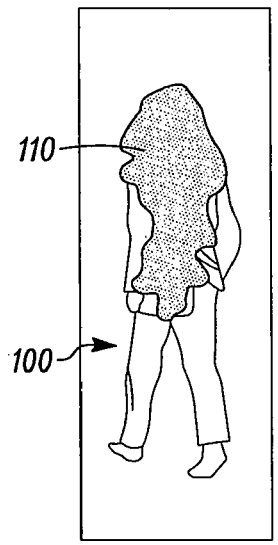 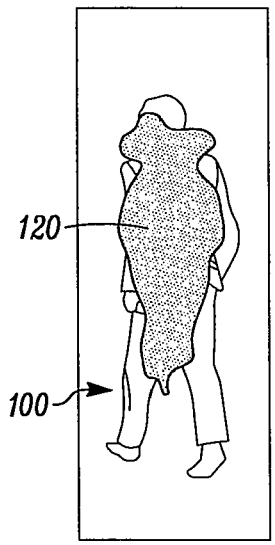 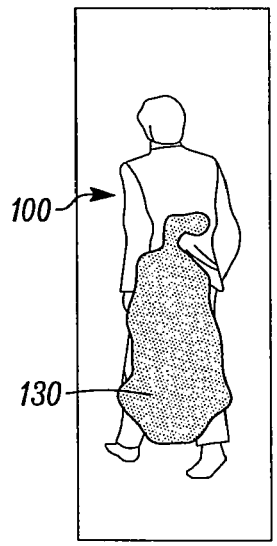
*FIG. 1A*     *FIG. 1B*     *FIG. 1C*
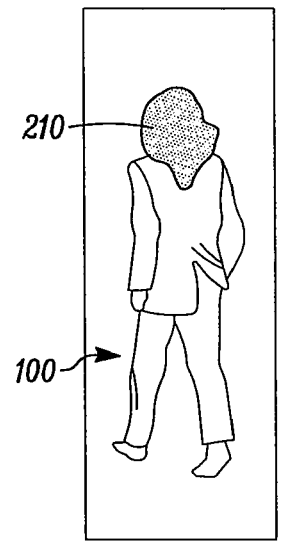 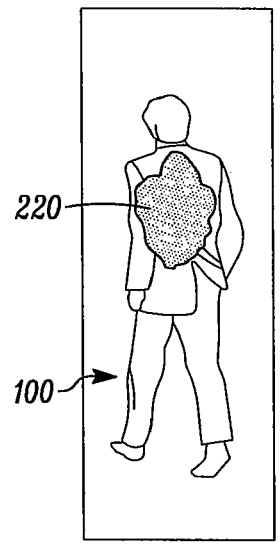 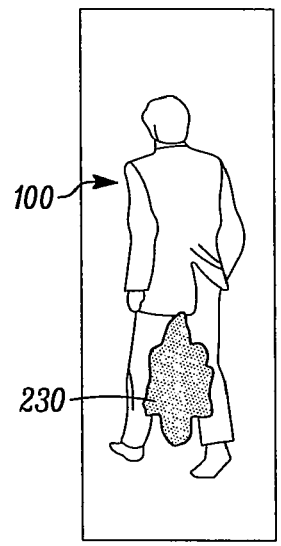
*FIG. 2A*     *FIG. 2B*     *FIG. 2C*

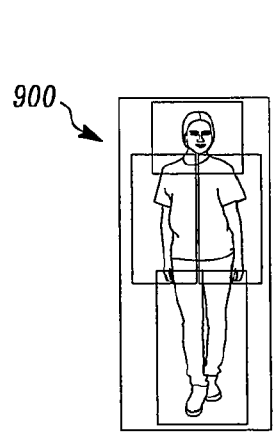
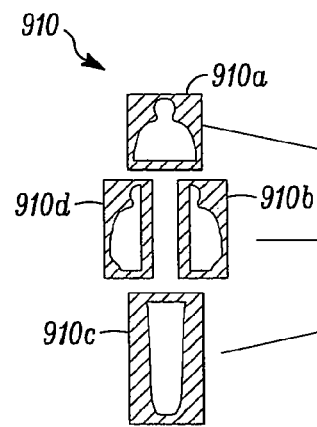
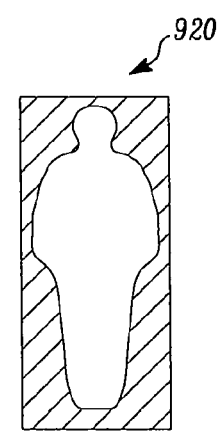
HYPOTHESIS
WITH PART
DETECTIONS
PRE-LEARNT
SEGMENTATION
MASKS
TOP-DOWN
SEGMENTATION
MASK
*FIG. 9A*   *FIG. 9B*   *FIG. 9C*

DETECTION OF PEOPLE IN REAL WORLD VIDEOS AND IMAGES

CROSS-REFERENCE TO RELATED APPLICATIONS

This application claims priority to U.S. Provisional Patent Application No. 61/149,858 filed Feb. 4, 2009 titled "Improved Detection of Individuals in Real World Video/Images." U.S. Provisional Patent Application No. 61/149,858 is hereby incorporated by reference.

FIELD OF INVENTION

The present invention relates generally to video surveillance. More particularly, the present invention relates to detection of people in video data streams and image data.

BACKGROUND

Video surveillance is an integral part of the technology used in modern day security systems. Known security systems can include surveillance cameras, video recorders, and video viewers so that surveillance cameras or other data collection devices monitor a particular region. Video data streams or image data from the cameras can be displayed and monitored by security personnel on video viewers or monitors, and the video or images can be stored in associated video recorders or other data storage devices.

One aspect of video surveillance is detecting objects of interest, including people, in the video data streams or image data. Systems and methods have been developed to detect people in video data streams or image data. For example, U.S. application Ser. No. 11/870,237 filed Oct. 10, 2007 titled "People Detection in Video and Image Data" discloses systems and methods to detect a person in image data. U.S. application Ser. No. 11/870,237 is assigned to the assignee hereof and is hereby incorporated by reference.

Detecting people in video data streams or image data present various challenges. For example, problems arise when detecting people in different poses and articulations. Because people move in fluid motions, the shapes of people are virtually endless. Additionally, there is often a large variation in the appearance of people both globally and locally because of changes in clothing style and/or camera angles. Finally, a monitored region may be crowded, which may cause occlusion between people. Occlusion between people, or other barriers between a person and a camera, may significantly complicate detecting the person.

In view of the above, there is a continuing, ongoing need for improved systems and methods of detecting people in video data streams or image data. Preferably, such systems and methods efficiently and effectively detect people in various poses, positions, and shapes and in crowded monitored regions.

BRIEF DESCRIPTION OF THE DRAWINGS

FIG. 1A is an image showing the spatial distribution of a head that is generated using salient features;

FIG. 1B is an image showing the spatial distribution of a torso that is generated using salient features;

FIG. 1C is an image showing the spatial distribution of legs that is generated using salient features;

FIG. 2A is an image showing an improved spatial distribution of a head that is generated using AdaBoost detectors;

FIG. 2B is an image showing an improved spatial distribution of a torso that is generated using AdaBoost detectors;

FIG. 2C is an image showing an improved spatial distribution of legs that is generated using AdaBoost detectors;

FIG. 9A is an image with various body parts detected therein;

FIG. 9B is an image showing segmentation masks associated with the body parts detected in FIG. 9A;

FIG. 9C is an image showing a top-down segmentation mask generated using the segmentation masks of FIG. 9B;

DESCRIPTION OF THE PREFERRED EMBODIMENTS

Figure 3:
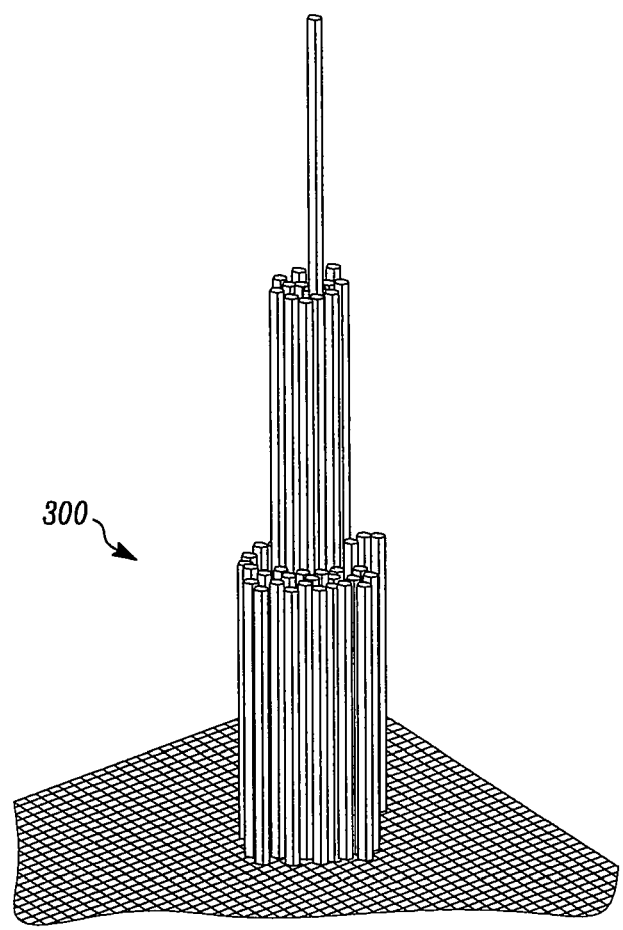
FIG. 3 is a histogram of finite ISM points for a person.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include improved systems and methods of detecting people in video data streams or image data. Systems and methods in accordance with the present invention can efficiently and effectively detect people in various poses, positions, and shapes and in a crowded monitored region.

Systems and methods in accordance with the present invention can include a training phase or mode, a detection phase or mode, and a segmentation phase or mode. Systems and methods of the present invention can learn to detect various body parts in the training phase or mode. Body parts can be detected in an image in the detection phase or mode, and a segmentation mask for a person can be generated in the segmentation phase or mode using the detected body parts.

Training Phase or Mode: In the training phase or mode, systems and methods of the present invention can be trained to recognize various body parts by introducing a plurality of sample images of those body parts. For example, the sample images can include people in various poses, positions, and articulations. As will be explained in further detail herein, the sample images introduced can be obtained from a wide variety of monitored regions with varying images, backgrounds, people, and clothing.

Using the introduced sample images, systems and methods in accordance with the present invention can learn an Implicit Shape Model (ISM), which is a three-dimensional (3D) spatial distribution of people. The spatial distribution can include an x location, a y location, and scale.

When a particular body part is detected in the detection phase or mode by systems and methods in accordance with the present invention, an ISM can identify the location and scale of a person in a monitored region based on the detection of the particular body part. The distribution of an ISM can be represented as $P(x/p,l)$ where x represents the row, column, and scale of the person (x, y, scale), where p represents the particular body part that has been detected, and l represents the location and size of the detected body part.

The spatial distribution of the ISM can account for the natural variation in height, size, and scale of body parts among different people. The spatial distribution of ISM can also account for the changes in the location of body parts due to different poses and/or articulations of a person. Finally, the spatial distribution can account for the performance of a particular body part.

For example, the performance of a particular body part can vary according to the scale of people in a monitored region. A body part may be identified more often at scales closer to a predefined training scale. Additionally, a body part may be identified by the pixels representing the body part as well as several pixels surrounding the body part. Further, one particular body part can be identified on multiple portions of the same person. The spatial distribution of the ISM can account for these types of variations.

As explained above, systems and methods of the present invention can learn the spatial distributions of the ISM by introducing sample video data streams or image data that show people with several different scales and ratios of body parts. The location of the centroids of these people can be known a priori and can be used to construct the spatial distributions of the ISM.

For example, FIG. 1A is an image showing the spatial distribution 110 of a head of a person 100, FIG. 1B is an image showing the spatial distribution 120 of a torso of a person 100, and FIG. 1C is an image showing the spatial distribution 130 of legs of a person 100. The spatial distributions shown in FIGS. 1A-1C are generated using salient features.

However, the use of salient features to generate spatial distributions presents several disadvantages. First, salient features are not always discriminative in nature. Instead, salient features are points in an image where salient gradient information is observed. Thus, salient features are equally likely to be found on a person as on the background. Further, salient features are driven by gradient information and are not guaranteed to be found in the same or similar locations from person to person. Finally, salient features are often sparse and may not always be located on a body part of interest.

In accordance with the present invention, Adaptive Boosting, or AdaBoost, detectors can be used. Unlike salient feature driven methods, AdaBoost detectors are discriminative in nature and can produce an ISM with points that can be represented by a spatial distribution in 3D space (x, y, scale).

Further, when an original spatial distribution is refined to remove points that are outliers, or that fall outside of a person, an improved spatial distribution can be generated. Improved spatial distributions in accordance with the present invention can be represented by a Gaussian distribution in 3D (x, y, scale) with mean and variance defined for each variable. For example, FIG. 2A is an image showing the improved spatial distribution 210 of a head of a person 100, FIG. 2B is an image showing the improved spatial distribution 220 of a torso of a person 100, and FIG. 2C is an image showing the improved spatial distribution 230 of legs of a person 100.

FIG. 3 is a histogram 300 of finite ISM points for a person. The histogram of FIG. 3 can be approximated by a Gaussian distribution with defined mean and variance. Thus, the histogram of FIG. 3 can closely match a mathematically definable symmetric distribution.

It is advantageous to replace an ISM with a Gaussian distribution for several reasons. First, the burden of storing and retrieving samples used to generate an ISM is removed. Instead, an ISM for a particular body part can be represented by a mean and variance in 3D. This reduces the computational burden of systems and methods of the present invention. Additionally, a Gaussian distribution is a more accurate and smooth representation of an ISM for a body part. Finally, a Gaussian distribution is continuous so the determination of body part positions can be more accurate.

In embodiments of the present invention, a look up table (LUT) can be used for various classifiers in the training phase or mode. For example, values can be assigned to different features, and these values can be segregated into categories. Each category can be associated with a weight (positive or negative) depending on the number of training sample images (positive or negative) that fall within the category.

The value assigned to a particular feature can be calculated for all of the training samples, and the minimum and maximum value of the feature can be estimated. Then, the range of value of the particular feature can be divided into an equal number of categories. Alternatively, the range of value of the particular feature can be divided into a non-equal number of categories based on the density of the input samples.

Depending on how many positive or negative samples fall within each category, the category can be associated with a weight. The weight associated with a particular category, can be used to weight a value associated with a feature detected on an input image, for example.

Figure 7:
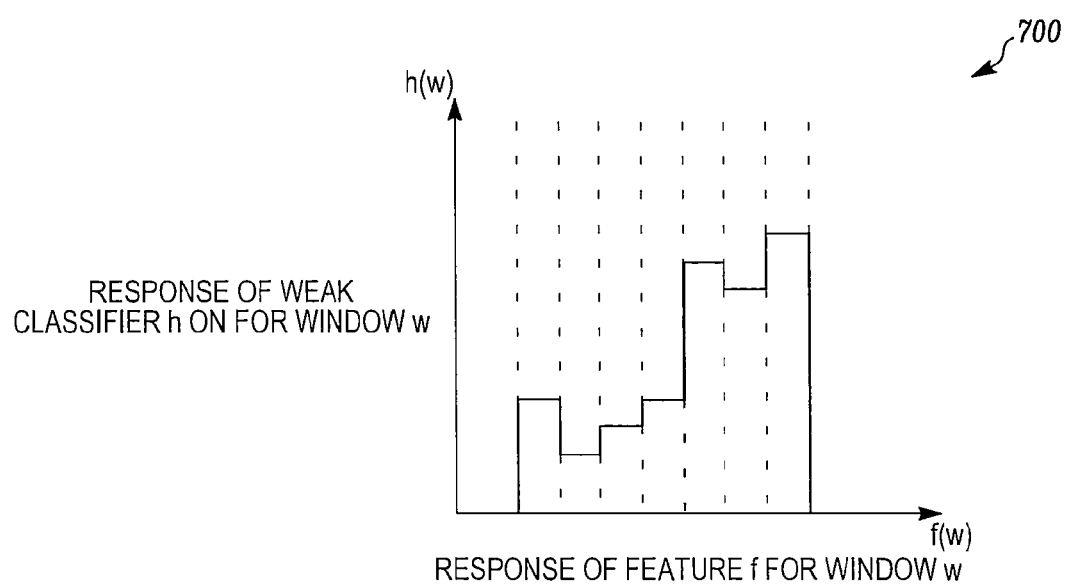
FIG. 7 is a graph showing the response of a weak classifier for a window versus the response of a feature for a window.

A LUT based weak classifier can perform better than a threshold based weak classifier because it can adapt to multimodal distribution of positive and negative sample feature values. FIG. 7 is a graph 700 showing the response of a weak classifier, h, for a window, w, versus the response of a feature, f, for a window, w.

Detection Phase or Mode: In the detection phase or mode, systems and methods according to the present invention can classify an input image into people and background. To classify and determine a location of a person in an input image, a body part can first be detected in the input image.

For example, using the AdaBoost body part detectors learned during the training phase or mode, systems and methods of the present invention can detect body parts on or in an input video data stream or input image data. In embodiments of the present invention, systems and methods can detect multiple body parts and/or can detect the same body part multiple times in one input image.

In embodiments, systems and methods of the present invention can assign a confidence value to each AdaBoost detection of a body part. The confidence value can be used as a weighing factor because it identifies the strength with which the detection is identified and indicates the likelihood that the detected body part is in the detected location. Differential weights can be assigned by multiplying the detection by the assigned AdaBoost confidence value.

Additionally, multiple AdaBoost detections of a body part can be prioritized using the AdaBoost confidence value if, for example, multiple detections are clustered together for the same body part around a particular location. When detections for the same body part are clustered together, it is redundant to retain all of the detections.

It is known that two body parts cannot occur in a region without a minimum space between the parts and in the x, y, and scale directions. Thus, closely spaced detections of the same body part can be clustered into one effective detection. The confidence values of each detection in the cluster can be added together to obtain the confidence value of the one effective detection.

Further, the location of the one effective detection can be represented by a range of the location (x, y, scale) of the detection in the cluster with the highest confidence value. It is most likely that the detection with the highest confidence value in a cluster most accurately represents the location of the identified body part and thus, that the body part is within the range of location (x, y, scale) of the detection with the highest confidence value.

In embodiments of the present invention, the range of location of the effective detection in the x and y directions can be half the width and height of the clustered detection boxes. The range of location of the effective detection in scale can be 1.5 in log scale. That is, the ratio of scales of the clustered detection boxes can be less than 1.5 to be considered as falling within the same range of location.

Using such limitations on the range of location of the effective detection, the effective detection can include detections that cannot otherwise occur separately, such as two occluded body parts. Further, detections that are not supported by a minimum confidence value and a minimum density of detections can be removed from the effective detection. Thus, detections that are false alarms are reduced and/or substantially eliminated while detections that are true detections are preserved.

Figure 4A:
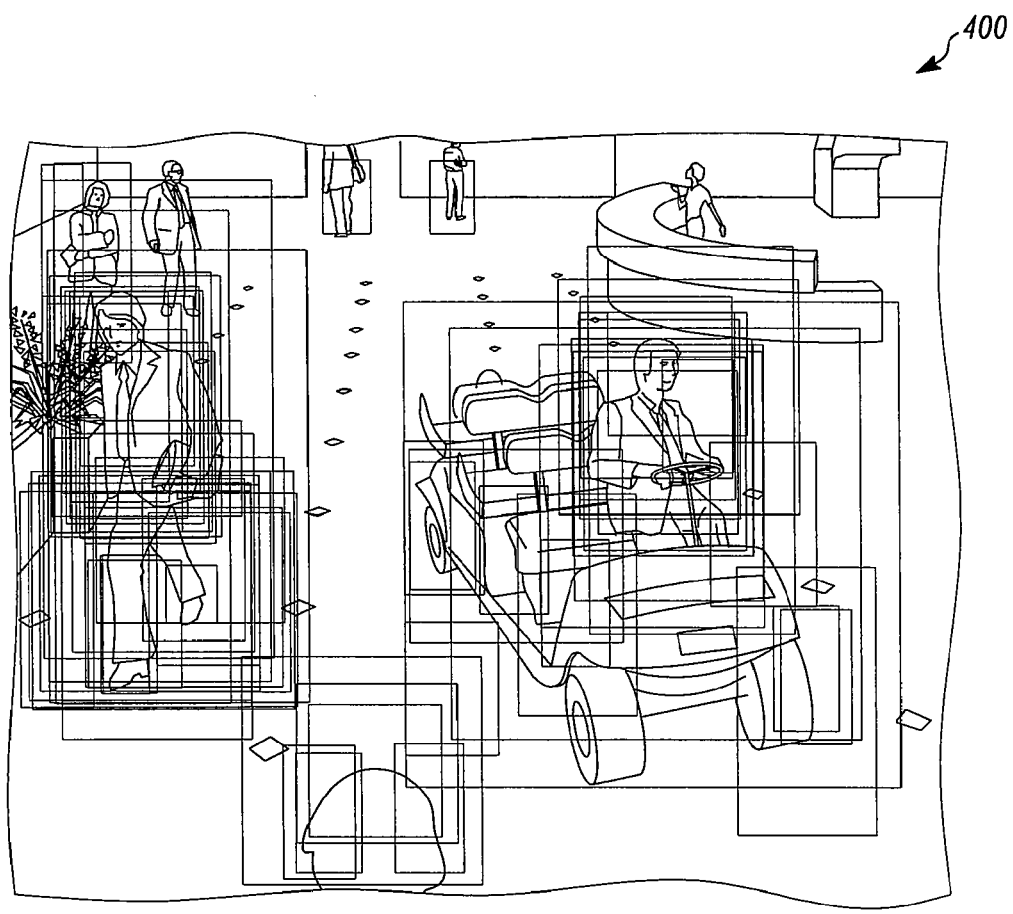
FIG. 4A is an image showing AdaBoost detections before clustering.
Figure 4B:
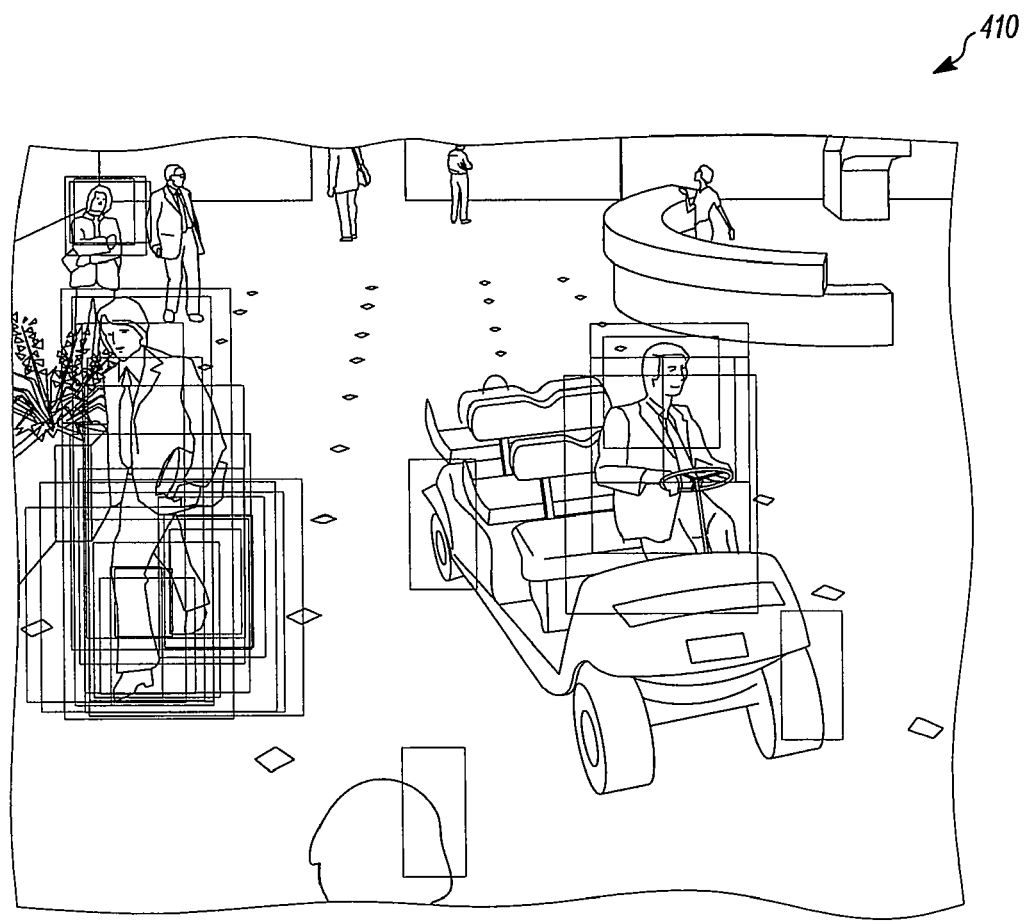
FIG. 4B is an image showing AdaBoost detections after clustering.

For example, FIG. 4A is an image 400 showing AdaBoost detections before clustering, and FIG. 4B is an image 410 showing AdaBoost detections after clustering in accordance with the present invention. As seen in FIGS. 4A and 4B, the density of detections can be significantly reduced by clustering detections. That is, the density of detections can be significantly reduced by compressing and/or replacing closely spaced detections with a single effective detection. The location and confidence value of the single effective detection can be computed as explained and described above.

In accordance with further embodiments of the present invention, multiple effective detections in a particular region can be selectively retained to further reduce and/or substantially eliminate redundant detections. It is known that no two detections of different body parts can occur at the same position in a particular region. At most, two different body parts can overlap one another by a predefined range of location. However, two different body parts from two different people cannot occur at the same position (x, y, scale) in the region.

Thus, in accordance with the present invention, if detections of two different body parts are within a predefined range of location (x, y, scale), then one of every two overlapping detections can be removed. The detection with the lower confidence value can be removed because it is less likely that a body part is present at that location.

Figure 4C:
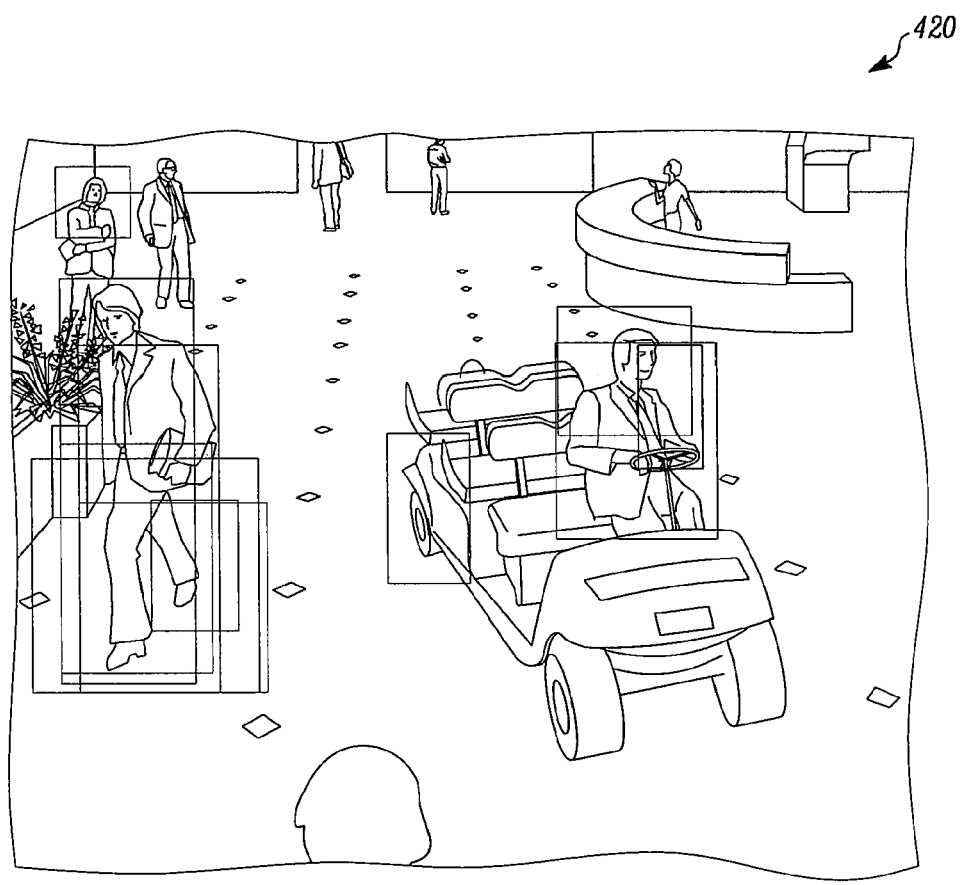
FIG. 4C is an image showing selectively retained AdaBoost detections after clustering.

For example, FIG. 4C is an image 420 showing selectively retained AdaBoost detections after clustering. It is advantageous to cluster detections of the same body part together for creating one accurate detection for each cluster of detections, and selectively retain detections for several reasons. First, redundant detections and false alarm detections of both body parts and people can be reduced and/or substantially eliminated. Second, an effective detection more accurately represents the location (x, y, scale) of a detected body part. Finally, reducing the number of detections reduces the computational burden of systems and methods of the present invention.

In accordance with further embodiments of the present invention, systems and methods can estimate the height of a person in a monitored region. For example, in the detection phase or mode, systems and methods of the present invention can use a priori information about the monitored region to compute a probability that a particular body part, p, can be identified at a location and scale, l, where l=(x, y, scale). This probability can be represented as P(p,l).

To calculate P(p,l), a user can first manually mark a number of people at different locations in the scene, for example, by drawing boxes around the people. Using this information, the respective heights of the various people at their locations can be interpolated.

The interpolated relative height at a location (r, c) can be represented by $l_h(r,c)$. When a particular body part is detected as explained above, P(p,l), can be represented as follows:

$$P(p, l) = 0.5/T \quad \text{if } (\text{abs}(l_h(x, y) - \text{scale}) < T)$$
$$= 0 \quad \text{otherwise}$$

where T is a threshold that can be predefined as a function of the amount of change tolerated in the height of a detected person at a particular location and the estimated height during a training phase or mode. A lower value of T means that a smaller tolerance is allowed.

In accordance with the present invention, a non-linear interpolation method can be used for estimating the height of a person on or in an input video data stream or input image data. Such a method can provide a smooth estimated plane that is continuous and can be differentiated at all points.

For example, an inverse distance weighted average method can be employed such that the weighting function is modified and the nearby points are selected to overcome disadvantages of known inverse-distance weighting methods. Further, direction and slope information at a particular location in the monitored region can be incorporated into height estimates so that the estimate doesn't depend solely on the distance from the sample points. Instead, estimates can also depend on direction and slope with respect to the point where height is being estimated.

Accordingly, the interpolated points can have increased accuracy as the number of samples taken is increased. Further, height weight can be assigned to a sample point close to the location of estimation taking into account the nature and non-linearity of the monitored region. Additionally, error in the estimation process can be reduced and/or substantially eliminated.

Figure 5:
FIG. 5 is an image showing a monitored region in which heights are to be estimated.
Figure 6A:
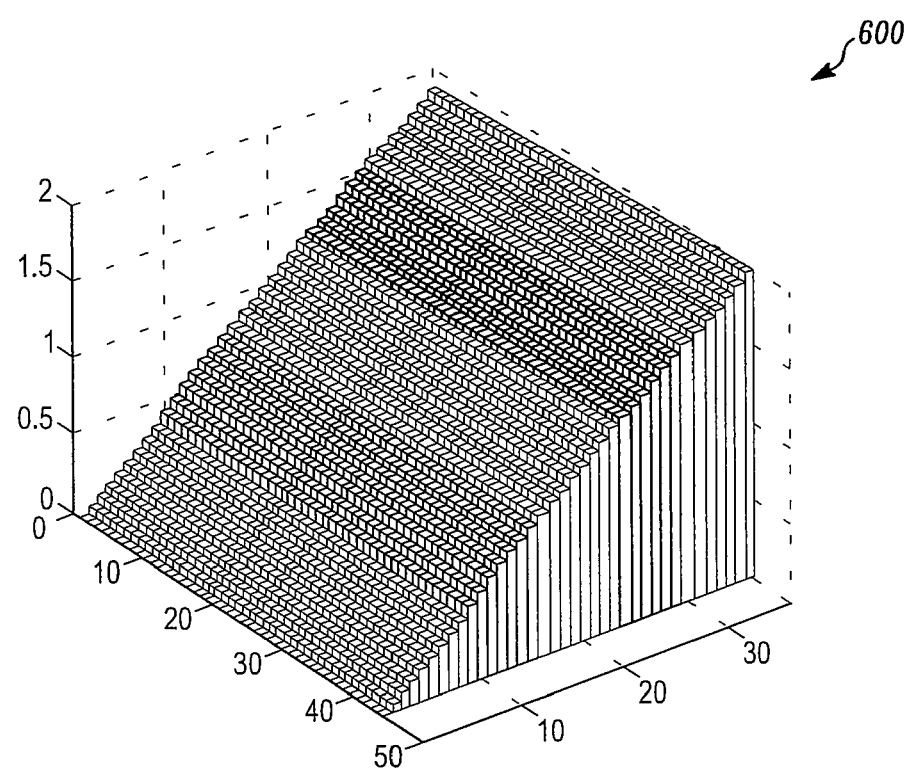
FIG. 6A is a graph showing height estimation using a linear interpolation.
Figure 6B:
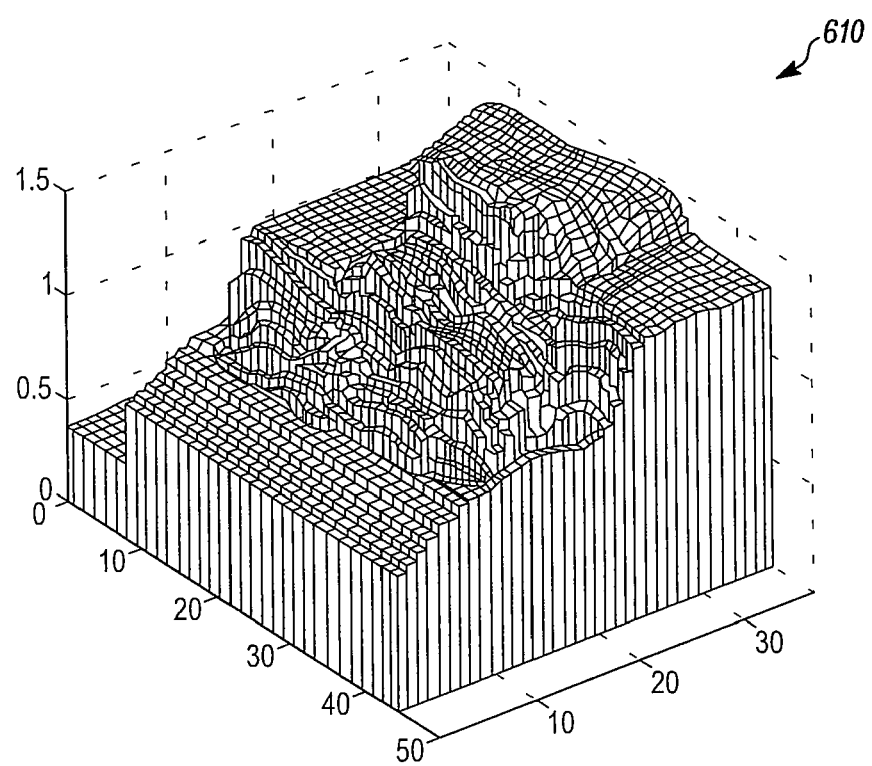
FIG. 6B is a graph showing height estimation using a non-linear interpolation.

FIG. 5 is an image 500 showing a monitored region in which heights are to be estimated. FIG. 6A is graph 600 showing height estimation using a 2D linear interpolation, and FIG. 6B is a graph 610 showing height estimation using a 3D non-linear interpolation. In FIGS. 6A and 6B, the X and Y axes are rotated to make the estimated plane suitable for viewing, and the third dimension represents the estimated heights.

Figure 6C:
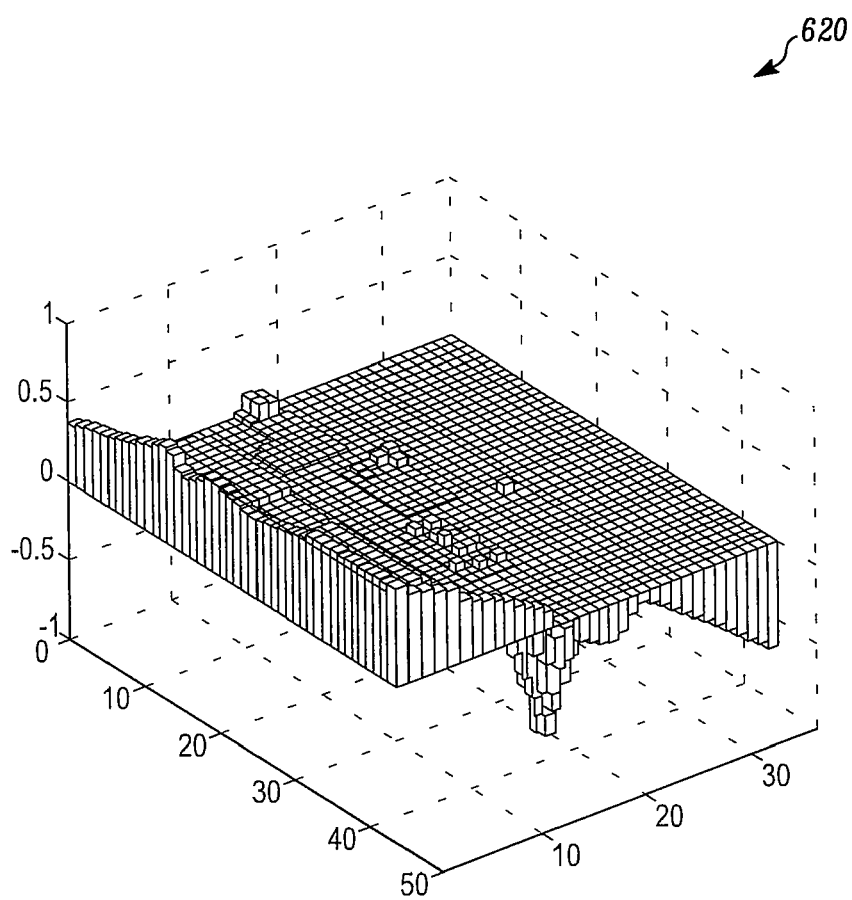
FIG. 6C is a graph showing difference values between a height estimation using a linear interpolation and a height estimation using a non-linear interpolation.

As seen in FIG. 6A, a linear interpolation can estimate a height close to zero at one end of the region and estimate an extremely large height at the opposite end of the region. In reality, such variances in height are not likely to occur. Accordingly, as seen in FIG. 6B, the non-linear interpolation more accurately estimates heights in the region. FIG. 6C is a graph 620 showing the difference values between the height estimations of the linear interpolation of FIG. 6A and the non-linear interpolation of FIG. 6B.

In some embodiments of the present invention, a Support Vector Machine (SVM) can be used as a post processor to reduce false alarms in detecting body parts. For example, an SVM classifier can be obtained using Histogram of Oriented Gradient (HOG) features. When using an SVM as a post processor, false alarm detections can be even further reduced and/or substantially eliminated while retaining substantially all true detections.

Segmentation Phase or Mode: After a body part has been detected, the location, position, and shape of an associated person can be determined in the segmentation phase or mode. For example, a segmentation mask for a person can be generated using the detected body parts.

In accordance with systems and methods of the present invention, a bottom-up segmentation method can be implemented to generate an image segmented according to a mean-shift based color segmentation. A top-down segmentation method can be implemented to generate a top-down segmentation mask. The mean-shift based color segmentation and the top-down segmentation mask can be combined to generate a combined segmentation mask. In embodiments of the present invention, the combined segmentation mask can represent the location, position, and shape of a person.

A bottom-up segmentation method can be performed using a mean-shift based color segmentation method to segment the input image into multiple homogenous regions based on pixel information. Segmentation can be performed by applying a mean-shift analysis on a five dimensional image feature space. For example, the five dimensional image feature space can include two spatial dimensions (x and y) and three color dimensions (L, U, V). A segmentation level can be changed by varying a mean-shift threshold.

Figure 8A:
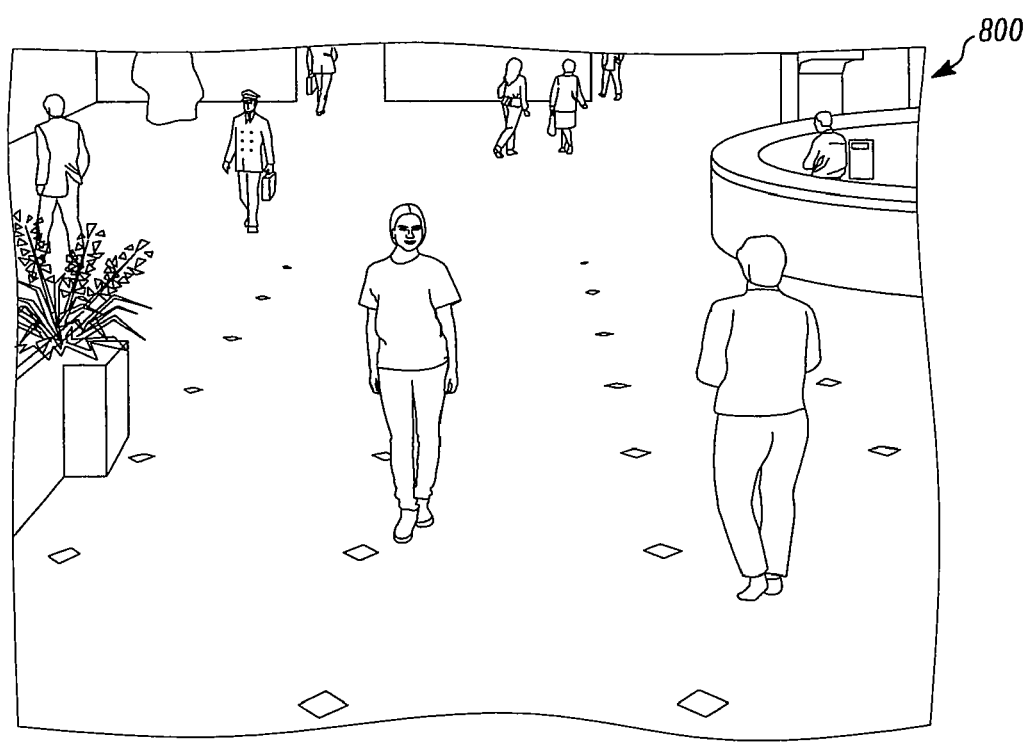
FIG. 8A is an input image of a monitored region.

In accordance with the bottom-up segmentation method, an image can be over-segmented by reducing the mean-shift threshold to a minimum. Over-segmentation can help in reducing the number of background pixels in a final segmentation by splitting the foreground and background segments into separate units. For example, FIG. 8A is an input image 800 of a monitored region, and FIG. 8B is an image 810 of a monitored region that has been segmented according to a mean-shift based color segmentation method.

A top-down segmentation method can be performed by combining previously learned body part segmentation masks into a probabilistic framework. For example, each AdaBoost body part can be associated with a previously learned segmentation mask, which can be generated as the weighted average of segmented sample images, as in the training phase or mode. Body part segmentation masks for each detected body part can be obtained and used to generate a top-down mask.

For example, FIG. 9A is an image 900 with various body parts detected therein. FIG. 9B is an image 910 showing segmentation masks 910a, 910b, 910c, and 910d associated with the body parts detected in FIG. 9A. Using the segmentation masks of FIG. 9B, FIG. 9C is a top-down segmentation mask 920 that is generated.

Figure 8B:
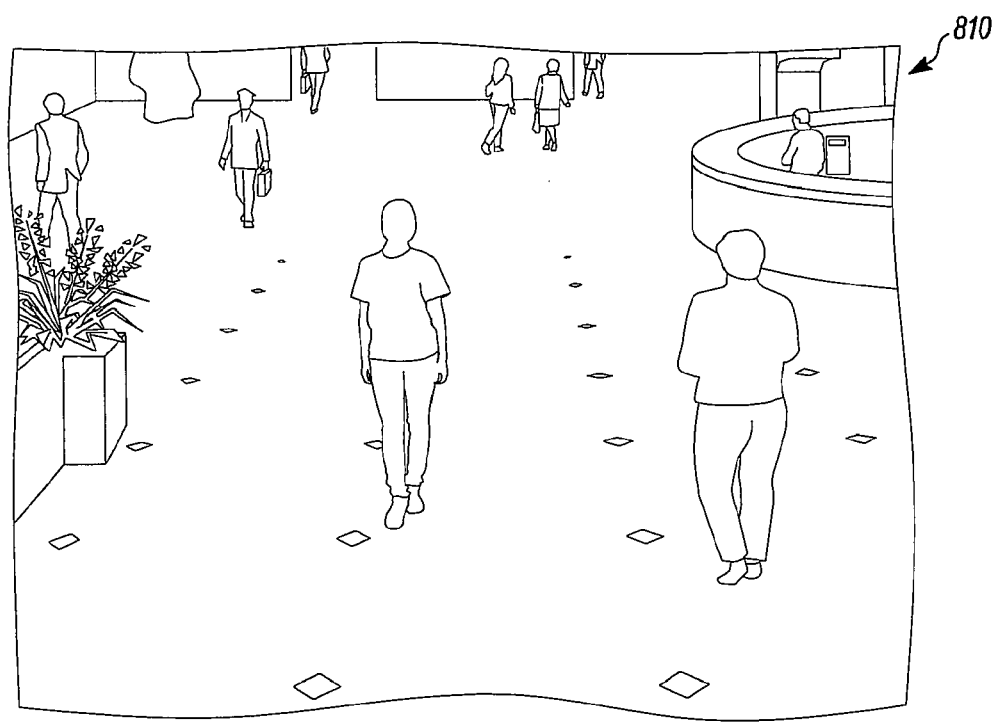
FIG. 8B is an image of a monitored region that has been segmented according to a mean-shift based color segmentation.

The mean-shift based color segmentation image 810 of FIG. 8B and the top-down segmentation mask 920 of FIG. 9C can be combined and compared with one another to determine the amount of overlapping area. For example, the overlapping area can be determined by flooding the top-down segmentation mask 920, using foreground pixels of the mean-shift based color segmentation image 810.

Figure 10:
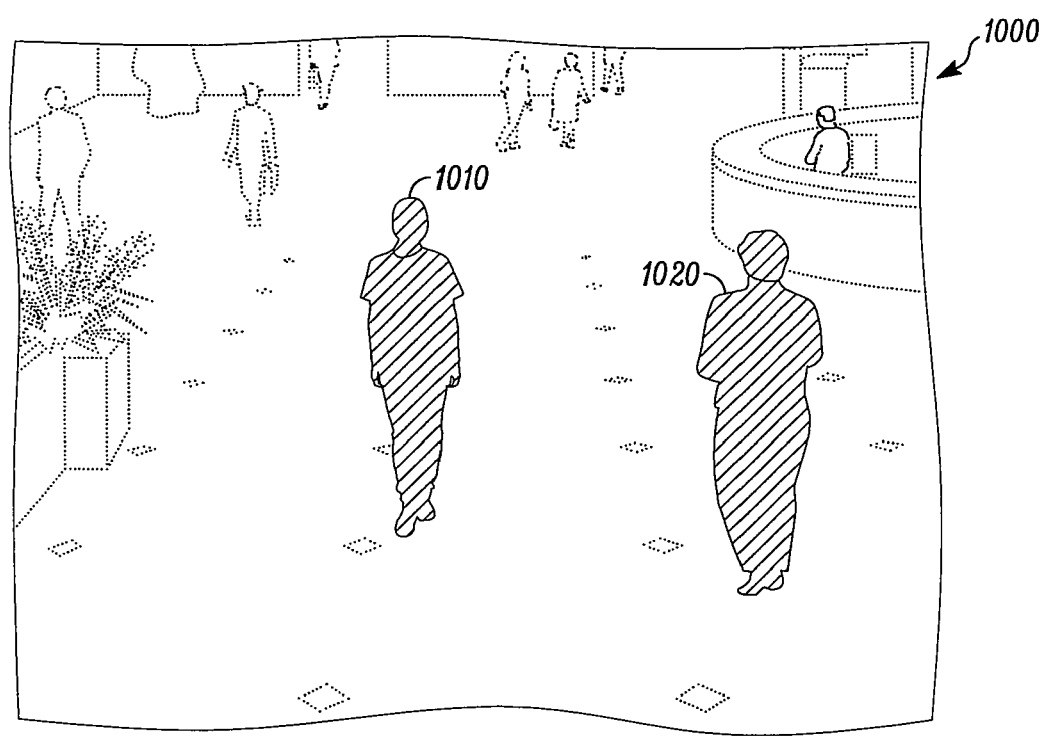
FIG. 10 is an image of first and second combined segmentation masks that have been subject to a shape constraint method.

A combined segmentation mask can be determined based on the overlapping area, and the combined segmentation mask can be subjected to a shape constraint method. The shape constraint method can ensure that the combined segmentation mask is as close as possible to the top-down segmentation mask 910 and that the combined segmentation mask conforms to the mean-shift based color segmentation image 810. FIG. 10 is an exemplary image 1000 of first and second combined segmentation masks 1010 and 1020 that have been subjected to a shape constraint method.

Figure 11:
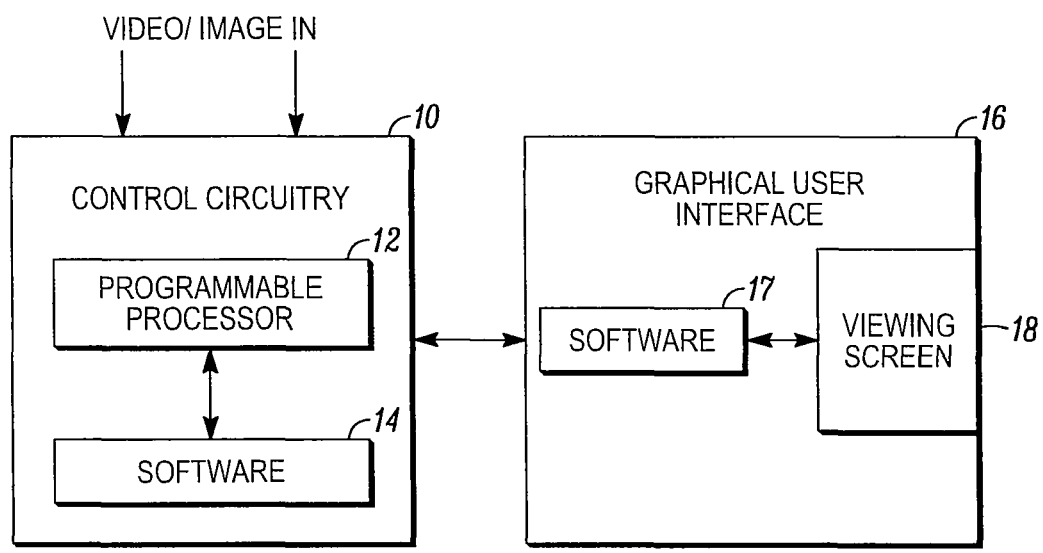
FIG. 11 is a block diagram of a system for carrying out methods in accordance with the present invention.

Methods in accordance with the present invention can be implemented with a programmable processor 12 and associated control circuitry 10. As seen in FIG. 11, control circuitry 10 can include a programmable processor 12 and associated software 14, stored on a local computer readable medium, as would be understood by those of skill in the art. Real-time or pre-stored video data streams and/or image data can be input into the programmable processor 12 and associated control circuitry 10.

An associated user interface 16 can be in communication with the processor 12 and associated circuitry 10. A viewing screen 18 of the graphical user interface 16, as would be known by those of skill in the art, can display images showing body parts and people detected in accordance with the present invention. In embodiments of the present invention, the user interface 16 can be a multi-dimensional graphical user interface.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A method comprising:

in a training mode, using a plurality of training images for learning spatial distributions associated with a plurality of body parts;

in the training mode, generating a three-dimensional implicit shape model of a person based on the plurality of training images, the three-dimensional implicit shape model including a three-dimensional spatial distribution of the person, the spatial distribution defined by at least x, y, and scale coordinates;

in a detection mode, detecting a plurality of detections of body parts in an input image, the detections of body parts are associated with respective previously learned spatial distributions associated with the plurality of body parts or with the three-dimensional spatial distribution of the person;

in the detection mode, assigning a confidence value to each detection of a body part;

in the detection mode, when first and second detections of a first body part overlap, removing one of the first and second detections of the first body part;

in the detection mode, clustering the-remaining detections of body parts located within a predetermined distance from one another to create one effective detection for each cluster of detections; and in a segmentation mode, determining a position of a person associated with each effective detection by combining detected and clustered body parts into a probabilistic framework.

2. The method of claim 1 wherein the spatial distributions are generated using AdaBoost detectors from the plurality of training images.

3. The method of claim 1 wherein the spatial distributions are represented by a three-dimensional Gaussian distribution.

4. The method of claim 1 further comprising assigning a confidence value to each effective detection, wherein the confidence value of the effective detection is the sum of the confidence values for each detection of body parts in the associated cluster.

5. The method of claim 4 further comprising determining a position of each effective detection, wherein the position of each effective detection is represented by a location of the detection in the associated cluster with the highest confidence value.

6. The method of claim 1 wherein determining the position of person associated with each effective detection further comprises generating a mean-shift based color segmentation image based on the input image and generating a top-down segmentation mask based on the spatial distributions associated with the plurality of body parts.

7. The method of claim 6 further comprising comparing the mean-shift based color segmentation image with the top-down segmentation image and determining an overlapping area of the mean-shift based color segmentation image and the top-down segmentation image, wherein a combined segmentation mask can be associated with the overlapping area.

8. The method of claim 7 further comprising processing the combined segmentation mask through a shape constraint method.

9. The method of claim 1 further comprising estimating a height of the person associated with each effective detection.

10. The method of claim 9 wherein estimating the height of the person includes interpolating a relative height of the person in a non-linear manner.

11. A method comprising:
in a training mode, using a plurality of training images for learning spatial distributions associated with a plurality of body parts;
in the training modes generating a three-dimensional implicit shape model of a person based on the plurality of training images, the three-dimensional implicit shape model including a three-dimensional spatial distribution of the person, the spatial distribution defined by at least x, y, and scale coordinates;
in a detection mode, detecting a plurality of detections of body parts in an input image, the detections of body parts are associated with respective previously learned spatial distributions associated with the plurality of body parts or with the three-dimensional spatial distribution of the person;
in the detection mode, assigning a confidence value to each detection of a body part;
in the detection mode, when first and second detections of a first body part overlap, removing one of the first and second detections of the first body part;
in the detection mode, clustering the-remaining detections of body parts located within a predetermined distance from one another to create one effective detection for each cluster of detections;
in a segmentation mode, determining a position of a person associated with each effective detection by combining detected and clustered body parts into a probabilistic framework; and
in the segmentation mode, filtering the plurality of detections using a secondary spatial distribution associated with a whole body.

12. The method of claim 11 further comprising filtering the plurality of detections with a support vector machine.

13. The method of claim 11 further comprising filtering the plurality of detections with a shape constraint method.

14. A system comprising:
control circuitry; and
software executable by the control circuitry and stored on a computer-readable medium for:
in a training mode, learning spatial distributions associated with a plurality of body parts based on a plurality of introduced training images;
in the training mode, generating a three-dimensional implicit shape model of a person based on the plurality of training images, the three-dimensional implicit shape model including a three-dimensional spatial distribution of the person, the spatial distribution defined by at least x, y, and scale coordinates;
in a detection mode, detecting a plurality of detections of body parts in an input image, the detections of body parts are associated with respective previously learned spatial distributions associated with the plurality of body parts or with the three-dimensional spatial distribution of the person;
in the detection mode, assigning a confidence value to each detection of a body part;
in the detection mode, when first and second detections of a first body part overlap, removing one of the first and second detections of the first body part;
in the detection mode; clustering the-remaining detections of body parts located within a predetermined distance, from one another to create one effective detection for each cluster of detections; and
in a segmentation mode, determining a position of a person associated with each effective detection by combining detected and clustered body parts into a probabilistic framework.

15. The system of claim 14 further comprising software executable by the control circuitry and stored on a computer-readable medium for assigning a confidence value to each detection of a body part and assigning a confidence valued to each effective detection, wherein the confidence value of the effective detection is the sum of the confidence values for each detection of body parts in the associated cluster.

16. A system comprising:
circuitry for, in a training mode, learning spatial distributions associated with a plurality of body parts based on a plurality of introduced training images;
circuitry for, in the training mode, generating a three-dimensional implicit shape model of a person based on the plurality of training images, the three-dimensional implicit shape model including a three-dimensional spatial distribution of the person, the spatial distribution defined by at least x, y, and scale coordinates;
circuitry for, in a detection mode, detecting a plurality of detections of body parts in an input image, the detections of body parts are associated with respective previously learned spatial distributions associated with the plurality of body parts or with the three-dimensional spatial distribution of the person;
circuitry for, in the detection mode, assigning a confidence value to each detection of a body part;
when first and second detections of a first body part overlap, circuitry for, in the detection mode, removing one of the first and second detections of the first body part;
circuitry for, in the detection mode, clustering remaining detections of body parts located within a predetermined distance from one another to create one effective detection for each cluster of detections; and circuitry for, in a segmentation mode, determining a position of a person associated with each effective detection by combining detected and clustered body parts into a probabilistic framework.

17. The system of claim 16 further comprising for assigning a confidence valued to each effective detection, wherein the confidence value of the effective detection is the sum of the confidence values for each detection of body parts in the associated cluster.

18. The method of claim 1 wherein removing the one of the first and second detections of the first body part includes removing the first detection when the confidence value of the first detection is lower than the confidence value of the second detection and removing the second detection if the confidence value of the second detection is lower than the confidence value of the first detection.

\* \* \* \* \*